United States Patent
Cypes et al.

(10) Patent No.: US 9,547,844 B2
(45) Date of Patent: Jan. 17, 2017

(54) SYSTEMS AND METHODS FOR LOCATION TRACKING IN A SOCIAL NETWORK

(75) Inventors: Gregory Brian Cypes, Potomac, MD (US); Shawn Michael Edwards Carnell, Berryville, VA (US); Rizwan Abdus Sattar, Aliso Viejo, CA (US); Steven Grayson Chipman, Ashburn, VA (US); Justin Scott Cohen, Arlington, VA (US); Neil Wayne Cohen, Oak Hill, VA (US); Andrew Lee Wick, McLean, VA (US); Amy Craig Joannou, Reston, VA (US)

(73) Assignee: AOL Inc., Dulles, VA (US)

( * ) Notice: Subject to any disclaimer, the term of this patent is extended or adjusted under 35 U.S.C. 154(b) by 1255 days.

(21) Appl. No.: 13/046,373

(22) Filed: Mar. 11, 2011

(65) Prior Publication Data

US 2011/0252095 A1 Oct. 13, 2011

Related U.S. Application Data

(60) Provisional application No. 61/313,110, filed on Mar. 11, 2010.

(51) Int. Cl.
*G06F 15/16* (2006.01)
*G06Q 10/10* (2012.01)

(52) U.S. Cl.
CPC .................................. *G06Q 10/107* (2013.01)

(58) Field of Classification Search
CPC .......................... H04L 12/5865; G06Q 10/107
USPC ......................................... 709/205, 206, 222
See application file for complete search history.

(56) References Cited

U.S. PATENT DOCUMENTS

| | | | |
|---|---|---|---|
| 2007/0100945 A1 | 5/2007 | Bohle et al. | |
| 2007/0244633 A1* | 10/2007 | Phillips | G08B 21/0236 701/408 |
| 2008/0040673 A1 | 2/2008 | Zuckerberg et al. | |
| 2008/0104227 A1 | 5/2008 | Birnie et al. | |
| 2010/0248744 A1* | 9/2010 | Bychkov | H04W 4/02 455/456.2 |
| 2011/0066949 A1* | 3/2011 | DeLuca | G06Q 10/10 715/744 |

OTHER PUBLICATIONS

Extended European Search Report, dated Dec. 10, 2013, issued for European Application No. EP 11 710 088.3, 8 pages.
International Search Report and Written Opinion of the International Search Report, dated Oct. 25, 2012, issued for International Application No. PCT/US2011/028186, 12 pages.

* cited by examiner

*Primary Examiner* — Suraj Joshi
*Assistant Examiner* — Joel Mesa
(74) *Attorney, Agent, or Firm* — Finnegan, Henderson, Farabow, Garrett & Dunner LLP

(57) ABSTRACT

Systems and methods are provided for location tracking and filtering or hiding electronic communications. In one implementation, a method is provided for location tracking for electronic communications. The method includes receiving a location ID for a location from a user who desires to follow the location within a social networking environment, and associating the location ID with the user. The method also includes providing instructions to display a representation of the location in a list of the user's contacts.

18 Claims, 5 Drawing Sheets

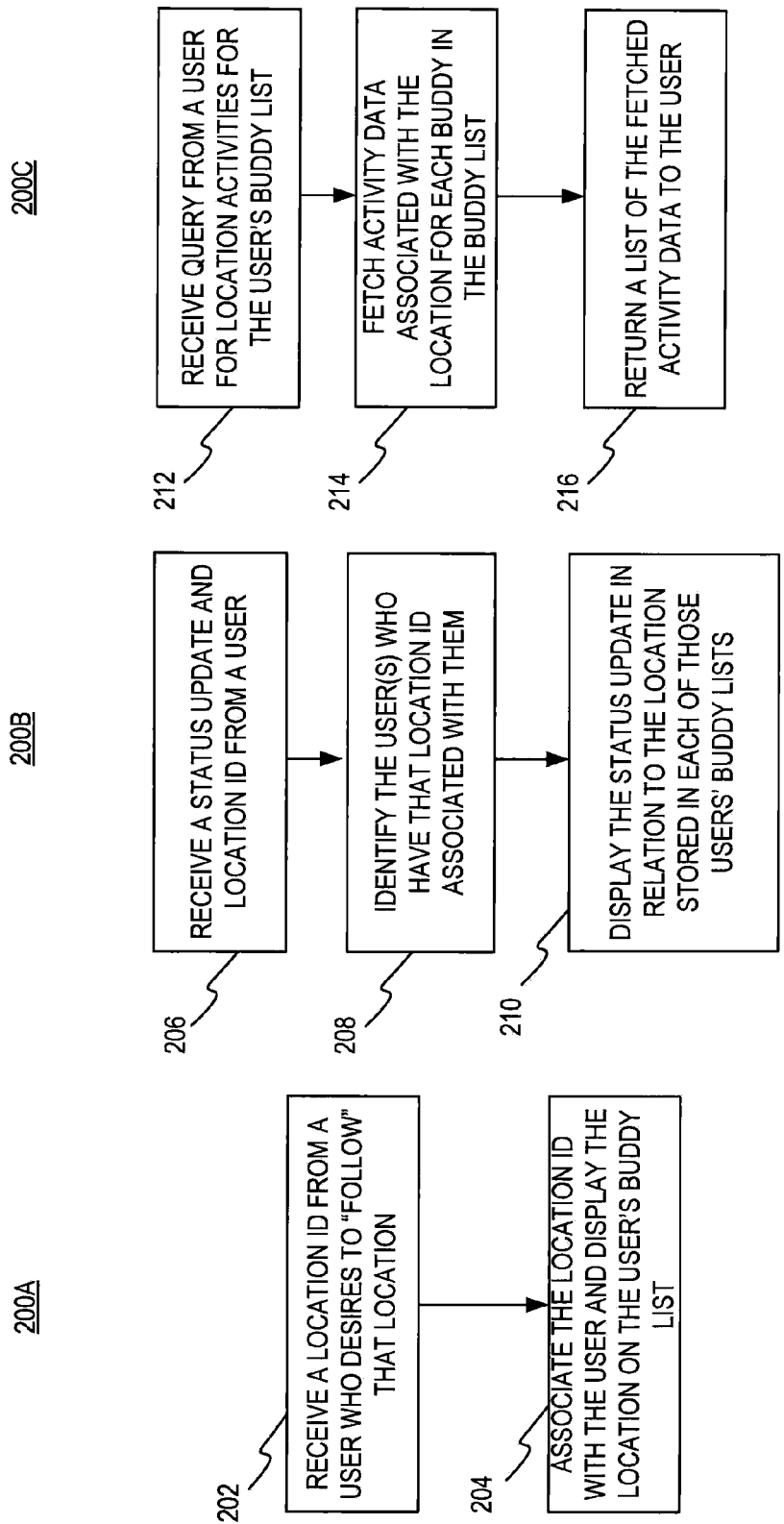

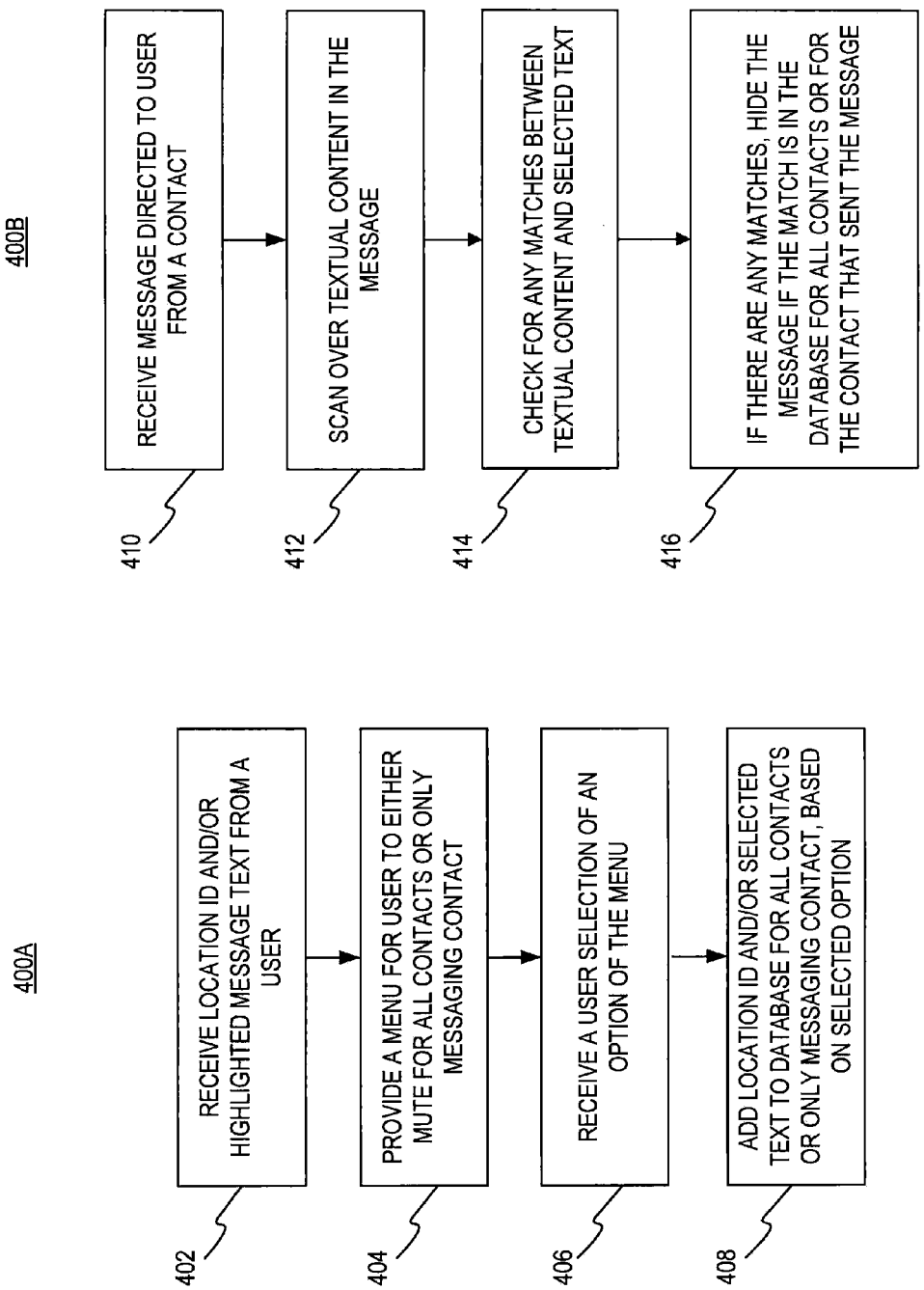

SYSTEMS AND METHODS FOR LOCATION TRACKING IN A SOCIAL NETWORK

RELATED APPLICATION(S)

This application claims the benefit of priority of U.S. Provisional Application No. 61/313,110, filed Mar. 11, 2010, titled "Systems and Methods for Location Tracking and Filtering Electronic Communications," the disclosure of which is expressly incorporated herein by reference in its entirety.

TECHNICAL FIELD

The present disclosure relates generally to systems and methods for electronic messaging. More particularly, and without limitation, the present disclosure relates to systems and methods for location tracking within a social networking portal using, for example, an instant messaging interface.

BACKGROUND

As more people turn to electronic communications for their social and professional interaction with others, people are finding their electronic communications interfaces becoming duplicative and difficult to manage. As a result, universal electronic messaging systems have been developed that allow users to obtain updates from their friends and some of their favorite social networks and websites. Such systems allow users to, for example, publish their status and broadcast it to their friends, and view updates from their friends from one or more sources, such as social networks (e.g., Digg, Facebook, Flickr, Twitter, YouTube and AIM). A user's communications may be aggregated on a universal messaging system and across the Web, so that the user can obtain updates in one convenient place. Users may also use the universal system to update their friends on what the user is doing by issuing only one post, while setting a status on networks such as AIM, Facebook, and Twitter.

In some systems, users may have options for setting their status. They can simply find an input field at the top of a browser or mobile interface, and enter the text they would like to share. They can also update their status by typing a status message from a phone with SMS or text message capabilities. Users may also easily add photos from a listing of friends (such as a "Buddy List") just by clicking into the status box at the top of the list and selecting the photos to upload.

In some cases, it may be desirable to associate a user's location with a user's status update and/or photo. For example, if a user is using a mobile device to interact with a universal messaging system, the user may want other people to know where the user was when the status update and/or photo was created. The user may also want other users to know more about that location. As a result, universal systems have been provided with features through which a latitude and longitude, location name, and/or map can be associated with a status update and/or photo. While this may give other users more information about that particular message, it does not provide a sufficient way for users to follow and keep track of a particular location.

In addition, in view of the large quantity of incoming status updates and photos that a single user may receive from across one or more social networks and friends, it may be desirable to filter out some of those communications. Past efforts have only focused on filtering out particular types of communications or senders of communications. However, these prior techniques do not provide a sufficient way for users to perform targeted filtering or hiding of communications relating to locations that are not of interest, or specific words or phrases.

The disclosed embodiments of the present disclosure are directed to overcoming one or more of the problems set forth above. Among other things, the disclosed embodiments include systems and methods for location tracking, and filtering or hiding electronic communications.

SUMMARY

Consistent with the present disclosure, computerized systems and methods are provided for location tracking and filtering or hiding electronic communications. The present disclosure is also directed to systems and methods for location tracking in, for example, a social network.

In accordance with one disclosed exemplary embodiment, a computer-implemented method is disclosed for location tracking for electronic communications. The method includes receiving a location ID for a location from a first user who desires to follow the location within a social networking environment; associating the location ID with an identifier of the first user in a database; and providing instructions to display a representation of the location in a list of the first user's contacts.

In accordance with another disclosed exemplary embodiment a computer system is disclosed for facilitating location tracking for electronic communications. The system includes a database configured to store location data and user data; and a messaging server disposed in communication with the database. The messaging server is configured to: receive a location ID for a location from a first user who desires to follow the location; associate the location ID with the first user by storing the location ID and an identifier of the first user in the database; and provide instructions to display a representation of the location in a list of the first user's contacts.

In accordance with another disclosed exemplary embodiment a non-transitory computer-readable storage medium is disclosed for storing instructions that, when executed by a computer, cause the computer to: receive a location ID for a location from a first user who desires to follow the location within a social networking environment; associate the location ID with an identifier of the first user in a database; and provide instructions to display a representation of the location in a list of the first user's contacts.

Before explaining certain embodiments of the disclosure in detail, it is to be understood that the disclosure is not limited in its application to the details of construction and to the arrangements of the components set forth in the following description or illustrated in the drawings. The disclosure is capable of embodiments in addition to those described and of being practiced and carried out in various ways. Also, it is to be understood that the phraseology and terminology employed herein, as well as in the abstract, are for the purpose of description and should not be regarded as limiting.

As such, those skilled in the art will appreciate that the conception upon which this disclosure is based may readily be utilized as a basis for designing other structures, methods, and systems for carrying out the several purposes of the present disclosure. It is important, therefore, to recognize that the claims should be regarded as including such equivalent constructions insofar as they do not depart from the spirit and scope of the present disclosure.

BRIEF DESCRIPTION OF DRAWINGS

The accompanying drawings, which are incorporated in and constitute a part of this disclosure, illustrate several embodiments and aspects of the present disclosure, and together with the description, serve to explain certain principles of the invention. In the drawings:

FIGS. 2A-2C depict exemplary methods for location tracking, consistent with embodiments of the present disclosure;

FIGS. 4A and 4B depict exemplary methods for filtering or hiding electronic communications, consistent with embodiments of the present disclosure.

Like reference symbols in the various drawings indicate like elements. For brevity, several elements in the figures described below are represented as monolithic entities. However, as would be understood by one skilled in the art, these elements each may include numerous interconnected computers and components designed to perform a set of specified operations and/or dedicated to a particular geographic region.

Additional objects and advantages will be set forth in part in the description which follows, and in part will be obvious from the description, or may be learned by practice of the embodiments of the invention. For example, the objects and advantages may be realized and attained by means of the elements and combinations particularly pointed out in the appended claims.

It is to be understood that both the foregoing general description and the following detailed description are exemplary and explanatory only and are not restrictive of the invention, as claimed.

DETAILED DESCRIPTION

Reference will now be made in detail to the present exemplary embodiments of the invention, examples of which are illustrated in the accompanying drawings. Wherever possible, the same reference numbers will be used throughout the drawings to refer to the same or like parts.

Figure 1:
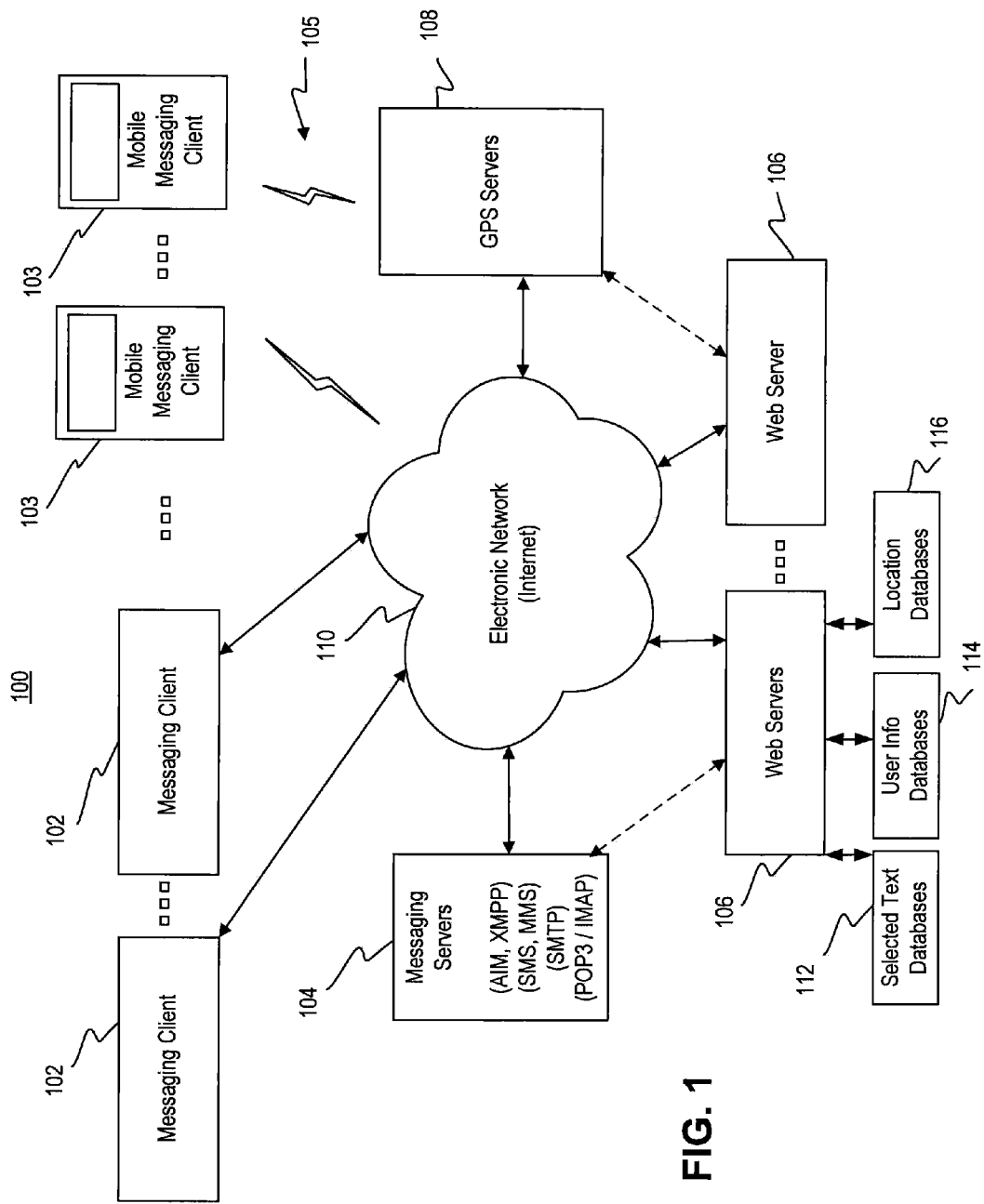
FIG. 1 depicts an exemplary system for location tracking and filtering or hiding electronic communications, consistent with embodiments of the present disclosure.

FIG. 1 is a block diagram of an exemplary communication system 100 for implementing embodiments of the present disclosure. Communication system 100 may include a location tracking and message filtering system, and may be configured to identify and process incoming electronic communications, and electronic media content using one or more of the embodiments disclosed herein. Electronic communications may include, for example, electronic messages (e.g., electronic mail messages, Short Messaging System ("SMS") messages, Multimedia Messaging System ("MMS") messages, etc.), standardized calendar files, invitations, status updates, etc. Electronic media content may include, for example, photographs, videos, songs, newsletters, articles, web pages, streaming media, or any other electronic multimedia. Communication system 100 may include any type of communication system, including, for example, a wired communication system, a wireless communication system, a local- or wide-area network, an Internet network, or any combination thereof.

As shown in FIG. 1, communication system 100 may include a plurality of messaging clients 102, mobile messaging clients 103, messaging servers 104, web servers 106, and GPS servers 108, all disposed in communication with an electronic network 110, such as the Internet. Messaging clients 102 and mobile messaging clients 103 may each interact with messaging servers 104, web servers 106, and/or GPS servers 108 through computers or processors connected to the electronic network 110 (such as the Internet), and/or through mobile communications networks. In one embodiment, messaging clients 102 may operate on desktop computers connected to the Internet, while mobile messaging clients 103 may operate on mobile devices, such as mobile phones or personal digital assistants ("PDAs"). Mobile messaging clients 103 may communicate with each other and/or any other device in communication with the Internet 110 through a mobile communications network 105.

Messaging servers 104 may be any type of servers configured to receive, route, and send electronic messages between devices connected to the Internet. For example, messaging servers 104 may send and receive e-mails, text messages, and/or instant messages. As shown in FIG. 1, messaging servers 104 may implement any suitable standard communications language or protocol, such as Extensible Messaging and Presence Protocol ("XMPP"), SMS, MMS, Simple Mail Transfer Protocol ("SMTP"), Post Office Protocol 3 ("POP3"), and/or Internet Message Access Protocol ("IMAP"). Of course, messaging servers 104 may implement any other suitable type of protocol or standard whether dedicated or universal. In one embodiment, messaging servers 104 may be disposed in communication with any type of large scale databases for storing user data, electronic media content, communications history data, location data, and/or user generated content.

Web servers 106 may be configured to operate and implement web pages and/or applications for display on one or more of messaging clients 102 and/or mobile messaging clients 103. For example, web servers 106 may implement web-based or browser-based email or messaging programs through which users may communicate by sending IMs, text messages, and/or e-mails. Web servers 106 may also implement browser-based mapping programs, media content programs, or any other entertainment or utility programs for display to users through the Internet 110 or a mobile network 105.

In one embodiment, web servers 106 may be disposed in communication with one or more back-end server systems and/or databases. For example, web servers 106 may be disposed in communication with one or more selected text databases 112, which are configured to store text (or objects, images, or other files) desired to be filtered or hidden by a user, as will be described in more detail below. Web servers 106 may also be disposed in communication with user info databases 114, which are configured to store user IDs, user mobile device information, user demographic information, user location coordinates, user preferences, etc. Web servers 106 may also be disposed in communication with location databases 116, which may be configured to store maps, coordinates, location information (e.g., restaurants, stores, venues, etc.), comments about locations, photos of locations, videos of locations, etc.

As further shown in FIG. 1, GPS servers 108 may also be disposed in communication with the Internet 110, web servers 106, and/or mobile messaging clients 103. GPS servers 108 may be configured to facilitate the communication of location data from mobile messaging clients 103. For instance, in one embodiment, each mobile messaging client 103 may be configured to detect and transmit to GPS servers 108 a latitude and longitude associated with a current location of the mobile messaging client. Alternatively, GPS servers 108 may receive such latitude and longitude data from satellites in communication with mobile messaging clients 103 and transmit such location data to mobile messaging clients 103, web servers 106, and/or messaging servers 104. GPS servers 108 may also be provided with or in communication with storage and processing systems for mapping mobile messaging clients 103 and/or mapping public locations, such as street data, restaurants, bars, clubs, stores, gas stations, museums, transportation sites, and/or entertainment venues.

The exemplary disclosed systems, methods, interfaces, programs, and portals that may be executed by communications system 100 will now be described in more detail with reference to the exemplary embodiments of FIGS. 2-5. The methods of FIGS. 2 and 3 may be performed by any combination of messaging clients 102, mobile messaging clients 103, messaging servers 104, web servers 106, and/or user info and location databases 114, 116, as will be described in more detail below.

Exemplary systems and methods consistent with the present disclosure are disclosed for providing, among other things, the ability for users to add, track, or follow a physical location or list of locations through their list of friends or buddy lists. In accordance with certain embodiments, location files may contain text, photos, videos, updates, and/or activities that have happened at that physical location.

As described above, a universal communication system may allow users to associate text or photo updates with a location. The system may use GPS servers 108 to automatically determine the user's location via latitude and longitude, or allow the user to select where he or she is currently located. The user may use applications running on messaging clients 102 or mobile messaging clients 103 to keep track of where friends or contacts are and what they are doing currently at a location. However, the user may also desire to follow a location and to see what is happening at that location regardless of whether a friend or contact is there or not. In other words, a user may desire to look at what is happening at location "X," regardless of whether the user is near that location or a friend is at that location. For this purpose, system 100 may be configured to persistently save a location and activity information within location databases 116, so at any time a user can quickly check to see what is happening in real-time at that location without having to remember where it is (e.g., without knowing a latitude/longitude or address), or the location's name.

Thus, communications system 100 may be configured to provide users with the ability to associate their status updates and/or photos with a location, via web servers 106. The location may be determined by using GPS on mobile devices to get latitude and longitude coordinates (e.g., using GPS servers 108), or for desktop and web applications from Operating System libraries or using Open Source/W3C standards, i.e. HTML5. The latitude and longitude coordinates may be used to reverse geo-encode the location to generate a human readable street address. The street address may then be used to look up businesses within a given radius (e.g., within 1 km radius). The user may then select the location based on the name and street address, or add a new location if it is not already in the list. The added location may then be stored in location databases 116 for future users to view. Each location, whether being returned from a reverse geo-encode lookup or manually added by the user, may have a unique identifier stored in relation to the location.

Once the location is associated with a status message and/or photo, the user can post the content to a messaging or social network via messaging servers 104. The posting of the message via messaging servers 104 may contain two new parameters, including latitude/longitude coordinates, and the unique location ID. Thus, status updates can belong to or be associated with both the user, and the unique ID representing a location. Any user can therefore view a location via that unique ID and see all the status updates occurring at that location. In another embodiment, only a user's buddies, contacts, or friends may view the posted status updates, location, photos, etc. of the user. In yet another embodiment, users may select whether only such contacts may view posts (e.g., private or closed system) or whether the entire network may view such posts (e.g. public or open system).

Figures 3A, 3B, 3C:
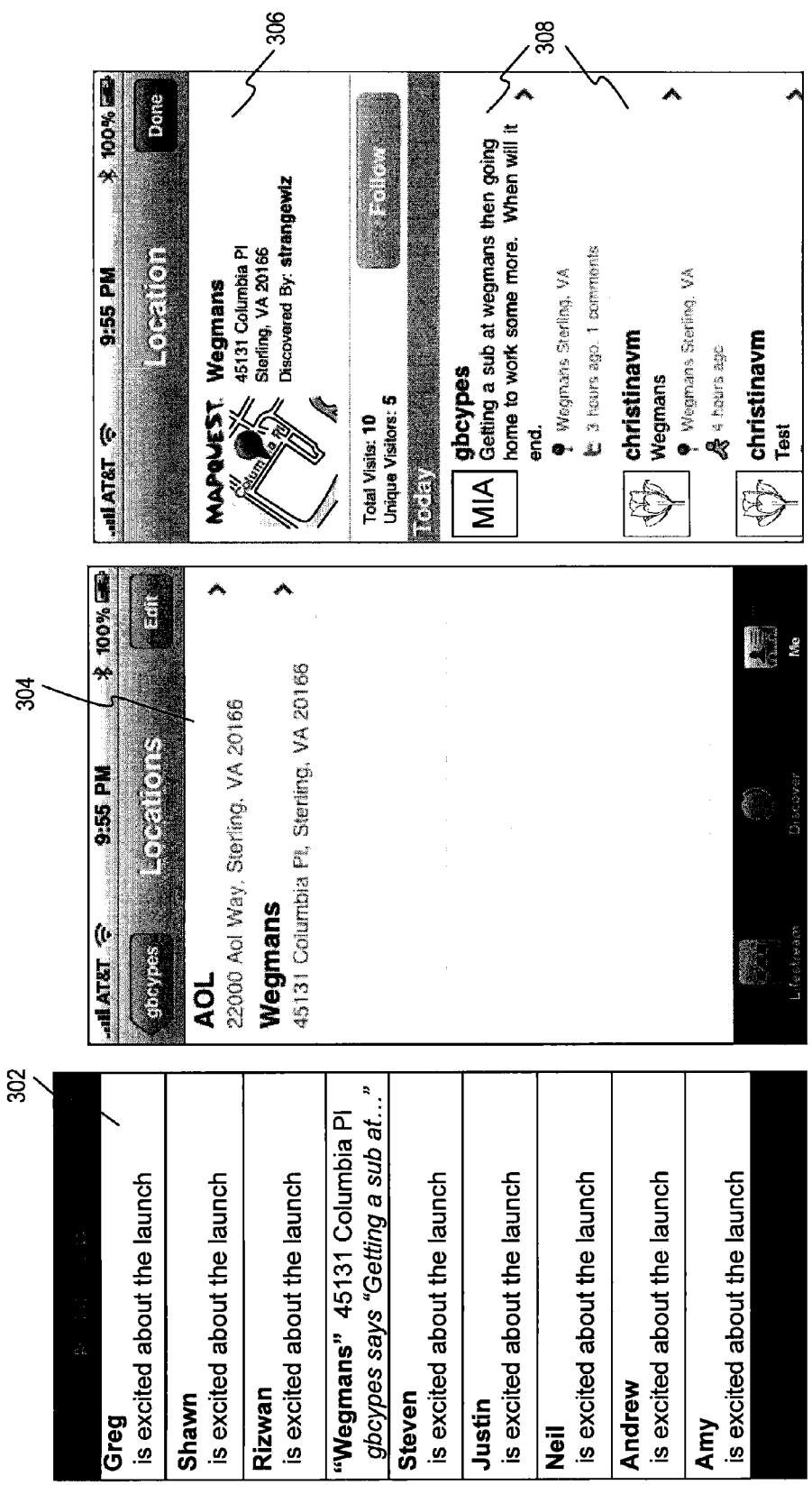
FIGS. 3A-3C depict exemplary screenshots of interfaces for location tracking, consistent with embodiments of the present disclosure.

Because a location has a unique ID, the location may be treated as if it were the type of screen name or user ID traditionally stored in a user's list of friends or buddy list (see, e.g., FIG. 3A). Thus, in accordance with exemplary systems and methods of the present disclosure, a user may follow a location by adding it to the user's buddy list. For example, users may employ applications operating on messaging clients 102 or mobile messaging clients 103 to add a location to a buddy list or list of friends. Web servers 106 may obtain information about the location by accessing location databases 116. The information stored in location databases 116 may include user status updates, check-ins, photos, videos, and/or general information about the location. Communications system 100 may allow users to follow multiple locations and view/receive updates from locations as they do from their contacts or buddies. For example, if User A is following location X (e.g., on a list of contacts or a buddy list), and User B, who is not buddies or friends with User A, updates their status from location X, User A will automatically see that update. This is due to User A's ability to persistently follow location X on User A's buddy list. A user may also be able to communicate with a location via an instant message or other means including audio or video communications or sessions.

Users may be able to set a location any time they update their status or upload photos or other content (video, audio, etc) to the system, which will log the event as an "activity." Once a location has an activity, any user on the network can follow that location to view activities happening at this location. The system may be accessible via desktop instant message systems, webmail, mobile applications, webpages, and any type of mobile device or smartphone.

The location features consistent with the present disclosure will now be described with reference to the exemplary embodiments of FIGS. 2A-2C and 3A-3C. Referring now to FIGS. 2A-2C, system 100 may perform various methods 200A-200C, including method 200A for associating location IDs with users, method 200B for updating users with location data, and method 200C for answering user queries for location activity data.

As shown in FIG. 2A, method 200A may include receiving a location ID from a user who desires to follow that location (step 202). For example, one or more of messaging servers 104 and web servers 106 may receive a location ID or selection of a location from one or more of messaging clients 102 and mobile messaging clients 103. Method 200 may then include associating the location ID with the user in user info database 114, and using web servers 106 to display the location on the user's buddy list (step 204). For example, FIG. 3A depicts a user's buddy list having a plurality of buddies 302, including a location (e.g., Wegmans) stored therein. These steps of receiving a location's unique ID and associating unique location IDs with users may be performed at any time, asynchronously, for any user when that user indicates interest in a location.

Meanwhile, assuming one or more users initiated steps 202 and 204 by electing to follow one or more locations, the web servers 106 may perform method 200B to automatically update those users on location activity. For example, at any given moment, the system may receive a status update and location ID from a user (step 206). In other words, a user may use a mobile messaging client 103 running on a smartphone or PDA to upload a status update and/or photo associated with the user's location (e.g., with the help of GPS servers 108). Web servers 106 may then identify the one or more users who have the location ID for that particular location associated with their user IDs (step 208). For example, web servers 106 may search for the location ID within user profiles stored in user info databases 114. Web servers 106 may then display the status update and/or photo in relation to the location stored in each of those users' buddy lists (step 210). That is, for each user who has the location ID stored in the user's buddy list, web servers 106 may generate a buddy list display, and display to those interested users the activity that initiated updating of the location.

By way of example, FIG. 3B shows a list of a plurality of locations 304 that a user is following. A user may click, tap, or otherwise select one of the locations 304 to view a location profile, as shown in FIG. 3C. The location profile may include detailed information 306 regarding the location, and/or a list of events or updates 308 shown in order of occurrence. Updates 308 may include user photos, user check-ins, user comments, or any other user-generated content regarding the location. In the embodiment of FIG. 3C, an exemplary location page is depicted for "Wegmens," including a plurality of user updates or activities 308 under the "Wegmans" location. Users may reach this location page by selecting the location from the exemplary buddy list of FIG. 3A or from the exemplary locations page of FIG. 3B. The updates may be shown by ranking of recency, popularity, positive feedback, number of comments, etc. The updates may also be displayed regardless of which messaging brand was used to create the status update.

With regard to method 200C, web servers 106 may receive a query from a user for activities for the user's buddy list (step 212). For instance, a user may desire to view all activities occurring in relation to a particular location in the user's buddy list. Web servers 106 may then fetch activity data associated with the location for each buddy in the buddy list (e.g., from user databases 114 and/or location databases 116) (step 214). Alternatively, web servers 106 may fetch activity data for all users associated with the location. Web servers 106 may then return a list of the fetched activity data to the user (step 216).

In one embodiment, a user can leave a note, image, video, audio, or other content at a location they have arrived at or "checked into," whereby the content is left for a particular user on the user's buddy list instead of for any and all users in the network. Thus, when that particular user visits the location and arrives or "checks in" upon arrival, the content will be delivered to that user. According to this embodiment, users may leave messages for particular contacts on their buddy list, where the message is only delivered when the particular contacts visit the location where the message was left. In one embodiment, if the selected contact never visits the location, the contact will never receive the message. In another embodiment, users can view a list of messages left for them at various locations, even without physically visiting or checking into the location.

Exemplary systems and methods consistent with the present disclosure are also disclosed for filtering or hiding messaging as desired by a user. As described above, the universal messaging system 100 may aggregate a collection of activities, including text updates from users on a variety of social networks.

In some cases, users may generate activities on one or more social networks, such as AIM, Facebook, or Twitter, that flood the activity stream with activities that a recipient user may not be interested in reading or otherwise consuming. In extreme cases, this activity may be considered to be a form of spam. Some social networks have tried to solve this problem by enabling the filtering or hiding of particular contacts or types of activities (e.g., "hide everything from Jim," or "hide all Tweets"). However, such systems provide no way of hiding all activities about a specific subject regardless of the user updating the activity or the medium through which the communication was sent.

Figure 5:
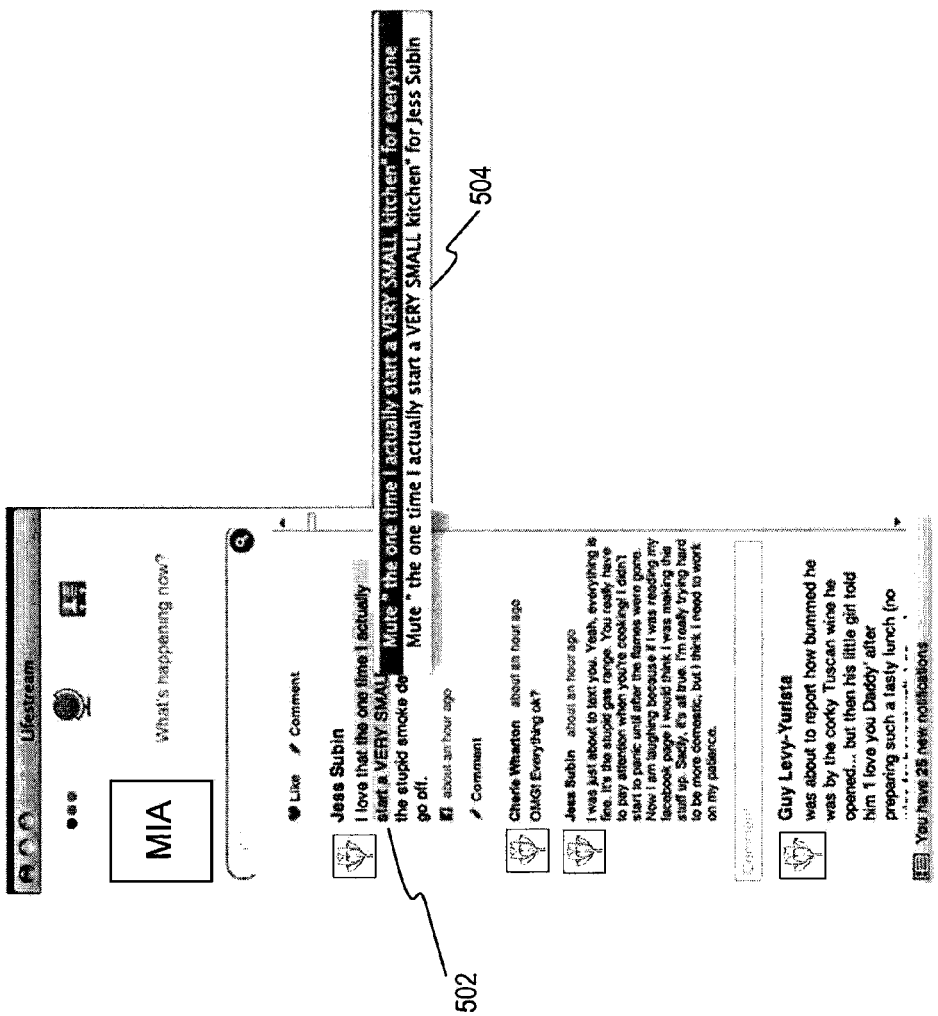
FIG. 5 depicts an exemplary screenshot of an interface for filtering or hiding electronic communications, consistent with embodiments of the present disclosure.

Accordingly, as shown with reference to the exemplary methods of FIGS. 4 and 5, system 100 may provide the ability for a user to filter or hide activities based on a location, partial text, a word, a set of words, and/or a user's ID. The user may also be able to filter based on objects, images, "avatars," file attachments, file types, or any other combination of distinguishing features or partial features. The methods of FIGS. 4 and 5 may be performed by any combination of messaging clients 102, mobile messaging clients 103, messaging servers 104, web servers 106, and/or selected text databases 112, as will be described in more detail below.

Referring now to the exemplary embodiment of FIGS. 4A and 4B, exemplary methods 400A and 400B may enable selected text of a specific activity to be hidden for all activities past, present, and future in the universal messaging system or social network. This hiding operation may be referred to as "muting" and it may be enabled at the client level. In one embodiment, muting may be determined based on text that the user has highlighted, and it may contain a subset of characters, a word, or a group of words, as shown in FIG. 5. For example, as shown in FIG. 5, a user may select a portion of text 502 within a news feed, electronic communication, status update, or the like. Messaging clients 102, 103 and/or web servers 106 may then generate a menu 504 by which a user may elect to mute or otherwise filter the selected text for all of the user's contacts ("everyone"), or solely for the user who initiated the selected text.

Thus, methods 400A and 400B may include hiding activities based on a free form text expression. For example, a user may hide or mute all activities from Jim when his activity contains the word "food". The text may be selected by highlighting, freeform entry into a text box, or any other user input means. The method may then implement hiding of any activities containing the text the user desired to mute. The muted text may be added to a list by which the user can control so as to un-mute the text and show the activities in the stream again. The particular string of text may be filtered or hidden with respect to a single contact, several selected contacts, or even everyone in the network.

Referring now to the exemplary embodiment of FIG. 4, method 400A may include receiving highlighted message text from a user (step 402). The web servers 106 may then provide a menu for the user to either filter or mute the selected message text for all contacts or only for a particular messaging contact (step 404).

The web servers 106 may receive a user selection of either option from the menu (step 406). The web servers 106 may then add the selected text to a database for all contacts, or only the particular message contact, based on the user's selected option (step 408). For instance, the selected text may be stored in selected text database 112 of system 100, in relation to one or more contacts. Steps 402-408 of method 400A may be performed asynchronously, any number of times, depending on how often and when users select message text to be muted.

One or more of messaging clients 102, 103 and web servers 106 may periodically perform method 400B, including receiving from any another contact a message directed to be delivered to a user (step 410). The web servers 106 (or any back-end servers) may iteratively scan and index over the textual content in the message (step 412). Although, as described above, one or more of messaging clients 102, 103 and web servers 106 may also scan or identify matching images, avatars, objects, file types, etc.

The web servers 106 or back-end servers may then check for any matches between textual content in the message and text selected and stored by the recipient user (step 414). For example, the web servers 106 or back-end servers may compare indexed message text with text stored by the recipient in selected text database 112 during step 408. If there are any matches between message text and the recipient's selected text, the web servers 106 or back-end servers may hide the message if the matched text is stored either in relation to the whole network or at least in relation to the sending user (step 416). In other words, the system may first verify whether the recipient user desired to block that text from the particular sending user.

Although described in relation to a universal messaging system, the presently disclosed embodiments may be implemented in relation to any type of electronic communications system, such as an e-mail system, an interoffice communications system, a mobile networking system, etc. Moreover, although disclosed in relation to a buddy list, these embodiments may also be used in relation to contact lists, employee lists, recent contact lists, archive lists, etc. The location tracking and filtering features described herein may also be used together, e.g., by filtering locations or adding locations based on filtered text. Finally, users may select between posting communications only to buddies, one or more buddies, or to the entire network, to selectively choose between either an open or closed system, or even a partially open and closed system.

Embodiments of the present disclosure may include a method or process, an apparatus or system, or computer software on a computer medium. It is intended that various modifications may be made without departing from the spirit and scope of the following claims. For example, advantageous results still could be achieved if steps of the disclosed techniques were performed in a different order and/or if components in the disclosed systems were combined in a different manner and/or replaced or supplemented by other components. Other implementations are within the scope of the following exemplary claims.

It will be apparent to those skilled in the art that various modifications and variations can be made to the systems and methods disclosed herein. It is intended that the disclosed embodiments and examples be considered as exemplary only, with a true scope of the present disclosure being indicated by the following claims and their equivalents.

What is claimed is:

1. A method of location tracking for electronic communications, the method comprising the following operations performed by one or more processors:
   receiving a location ID for a location from a first user who desires to follow a location profile page within a social networking environment;
   associating the location ID with an identifier of the first user in a database so that the location is added to a list of the first user's contacts; and
   generating instructions to display the list of the first user's contacts, the generating comprising:
      identifying a plurality of second users associated with the identifier of the first user in the database;
      identifying recent social networking activity associated with the second users;
      generating instructions to display, as part of entries in the list of the first user's contacts, information identifying the second users and at least a subset of the social networking activity associated with the second users;
      identifying the location ID associated with the identifier of the first user in the database;
      identifying recent social networking activity associated with the location ID; and
      generating instructions to display, as an entry in the list of the first user's contacts, a representation of the location linking to the location profile page and at least a subset of the social networking activity associated with the location ID.

2. The method of claim 1, further comprising:
   receiving, from the first user, a query for selected location-specific activities by the second users;
   fetching activity data associated with the selected location for each of the second users; and
   returning to the first user a list of the fetched activity data.

3. The method of claim 2, further comprising:
   generating instructions for displaying the list of the fetched activity data to the first user in a sequence consistent with the order of occurrence of the activities represented by the fetched activity data.

4. The method of claim 2, wherein the fetched activity data includes: a unique user ID associated with a user who performed a social networking activity in relation to the location; a time associated with the social networking activity; and an indication of the nature of the social networking activity.

5. The method of claim 1, further comprising:
   storing the location ID in association with one or more of a location address, location name, location map, and location photograph.

6. The method of claim 1, further comprising:
   providing a mechanism for the first user to initiate a query for viewing location-specific activities of the second users by clicking or touching the representation of the location, within the list of the first user's contacts.

7. The method of claim 1, wherein the social networking activity includes one or more of: checking-in to the location, posting a status update for the location, and uploading multimedia content associated with the location.

8. The method of claim 1, wherein the subset of the social networking activity associated with the location ID comprises a unique user ID associated with a user who performed the social networking activity.

9. A computer system for facilitating location tracking for electronic communications, the system comprising:

a database configured to store location data and user data; and a messaging server disposed in communication with the database and comprising:
- a hardware processor; and
- a memory device storing instructions for configuring the processor, wherein the processor is configured by the instructions to:
  - receive a location ID for a location from a first user who desires to follow a location profile page;
  - associate the location ID with an identifier of the first user in the database so that the location is added to a list of the first user's contacts; and
  - generate instructions to display the list of the first user's contacts, the generating comprising:
    - identifying a plurality of second users associated with the identifier of the first user in the database;
    - identifying recent social networking activity associated with the second users;
    - generating instructions to display, as part of entries of the list of the first user's contacts, information identifying the second users and at least a subset of the social networking activity associated with the second users;
    - identifying the location ID associated with the identifier of the first user in the database;
    - identifying recent social networking activity associated with the location ID; and
    - generating instructions to display, as part of an entry in the list of the first user's contacts, a representation of the location linking to the location profile pace and at least a subset of the social networking activity associated with the location ID.

10. The computer system of claim 9, wherein the processor is further configured to:
- receive from the first user a query for selected location-specific activities by the second users;
- fetch activity data associated with the selected location for each of the second users; and
- return to the first user a list of the fetched activity data.

11. The computer system of claim 10, wherein the processor is further configured to:
- generate instructions for displaying the list of the fetched activity data to the first user in a sequence consistent with the order of occurrence of the activities represented by the fetched activity data.

12. The computer system of claim 10, wherein the fetched activity data includes: a unique user ID associated with a user who performed a social networking activity in relation to the location; a time associated with the social networking activity; and an indication of the nature of the social networking activity.

13. The computer system of claim 9, wherein the processor is further configured to:
store the location ID in association with one or more of a location address, location name, location map, and location photograph.

14. The computer system of claim 9, wherein the social networking activity includes one or more of: checking-in to the location, posting a status update for the location, and uploading multimedia content associated with the location.

15. The computer system of claim 9, wherein the subset of the social networking activity associated with the location ID comprises a unique user ID associated with a user who performed the social networking activity.

16. A non-transitory computer-readable storage medium storing instructions that, when executed by a computer, cause the computer to:
- receive a location ID for a location from a first user who desires to follow a location profile page within a social networking environment;
- associate the location ID with an identifier of the first user in a database so that the location is added to a list of the first user's contacts; and
- generate instructions to display the list of the first user's contacts, the generating comprising:
  - identifying a plurality of second users associated with the identifier of the first user in the database;
  - identifying recent social networking activity associated with the second users;
  - generating instructions to display, as part of entries of the list of the first user's contacts, information identifying the second users and at least a subset of the social networking activity associated with the second users;
  - identifying the location ID associated with the identifier of the first user in the database;
  - identifying recent social networking activity associated with the location ID; and
  - generating instructions to display, as part of an entry in the list of the first user's contacts, a representation of the location linking to the location profile page and at least a subset of the social networking activity associated with the location ID.

17. The non-transitory computer medium of claim 16, further including instructions that, when executed by a computer, cause the computer to:
- receive from the first user a query for selected location-specific activities by the second users;
- fetch activity data associated with the selected location for each of the second users; and
- return to the first user a list of the fetched activity data.

18. The non-transitory computer medium of claim 16, wherein the subset of the social networking activity associated with the location ID comprises a unique user ID associated with a user who performed the social networking activity.

* * * * *

UNITED STATES PATENT AND TRADEMARK OFFICE
CERTIFICATE OF CORRECTION

PATENT NO. : 9,547,844 B2  
APPLICATION NO. : 13/046373  
DATED : January 17, 2017  
INVENTOR(S) : Gregory Brian Cypes et al.

Page 1 of 1

It is certified that error appears in the above-identified patent and that said Letters Patent is hereby corrected as shown below:

In the Claims

Claim 9, Column 11, Line 33, "location profile pace" should read -- location profile page --.

Signed and Sealed this
Eighteenth Day of April, 2017

Michelle K. Lee
*Director of the United States Patent and Trademark Office*